(12) United States Patent
Li et al.

(10) Patent No.: US 10,979,250 B2
(45) Date of Patent: Apr. 13, 2021

(54) SIGNALING FOR UPLINK SOUNDING

(71) Applicant: Intel IP Corporation, Santa Clara, CA (US)

(72) Inventors: Qinghua Li, San Ramon, CA (US);
Chittabrata Ghosh, Fremont, CA (US);
Robert J. Stacey, Portland, OR (US);
Xiaogang Chen, Portland, OR (US);
Po-Kai Huang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/513,385

(22) Filed: Jul. 16, 2019

(65) Prior Publication Data

US 2020/0014564 A1 Jan. 9, 2020

Related U.S. Application Data

(63) Continuation of application No. 15/282,749, filed on Sep. 30, 2016, now Pat. No. 10,397,024.
(Continued)

(51) Int. Cl.
*H04L 25/02* (2006.01)
*H04W 52/14* (2009.01)
(Continued)

(52) U.S. Cl.
CPC ........ *H04L 25/0224* (2013.01); *H04L 5/0044* (2013.01); *H04L 5/0051* (2013.01);
(Continued)

(58) Field of Classification Search
CPC ............ H04L 25/0224; H04W 52/146; H04W 72/0413; H04W 72/04; H04W 72/12;
(Continued)

(56) References Cited

U.S. PATENT DOCUMENTS 9,923,687 B2 * 3/2018 Wang ................... H04L 1/0026
10,154,520 B1 * 12/2018 Hedayat ............ H04W 74/0833
(Continued)

OTHER PUBLICATIONS

"U.S. Appl. No. 15/282,749, Non Final Office Action dated Apr. 25, 2018", 19 pgs.
(Continued)

*Primary Examiner* — Robert J Lopata
(74) *Attorney, Agent, or Firm* — Schwegman Lundberg & Woessner, P.A.

(57) ABSTRACT

Computing readable media, apparatuses, and methods for signaling for uplink sounding are disclosed. An apparatus is disclosed comprising processing circuitry. The processing circuitry may be configured to: decode a trigger frame comprising a resource unit (RU) allocation, and a spatial stream (SS) allocation for the first wireless device to transmit an uplink (UL) sounding signal, where the trigger frame include an indication that the trigger frame is for the UL sounding signal. The processing circuitry may be further configured to: determine a path loss based on the indication of the transmit power and a received power of the trigger frame at the first wireless device. The processing circuitry may be configured to: determine a transmit power for the UL sounding signal based on the path loss; and transmit the UL sounding signal in accordance with the RU allocation, the SS allocation, and the transmit power.

18 Claims, 9 Drawing Sheets

Related U.S. Application Data

(60) Provisional application No. 62/303,415, filed on Mar. 4, 2016.

(51) Int. Cl.
*H04L 5/00* (2006.01)
*H04W 52/24* (2009.01)
*H04W 72/08* (2009.01)
*H04W 72/04* (2009.01)

(52) U.S. Cl.
CPC ......... *H04L 5/0091* (2013.01); *H04W 52/146* (2013.01); *H04W 52/242* (2013.01); *H04W 72/085* (2013.01); *H04W 72/0473* (2013.01)

(58) Field of Classification Search
CPC ... H04W 76/00; H04B 7/2121; H04B 7/2123; H04J 2203/0069; H04Q 2213/394
USPC ........................................................ 370/329
See application file for complete search history.

(56) References Cited

U.S. PATENT DOCUMENTS

| | | | |
|---|---|---|---|
| 10,397,024 B2 | 8/2019 | Li et al. | |
| 2014/0133448 A1* | 5/2014 | Xu ...................... | H04W 52/242 370/329 |
| 2014/0219152 A1* | 8/2014 | Anto .................. | H04W 52/325 370/311 |
| 2015/0156665 A1* | 6/2015 | Kwak ............... | H04W 72/0426 370/236 |
| 2015/0223213 A1* | 8/2015 | Moon .................. | H04W 52/40 370/329 |
| 2015/0230247 A1* | 8/2015 | Yang ................. | H04W 72/0446 370/336 |
| 2016/0105265 A1* | 4/2016 | Wang .................. | H04B 17/309 370/252 |
| 2016/0119881 A1* | 4/2016 | Merlin ................ | H04L 27/2601 370/328 |
| 2016/0249303 A1* | 8/2016 | Kenney ............... | H04W 52/245 |
| 2016/0302185 A1* | 10/2016 | Sun ....................... | H04W 74/08 |
| 2016/0374085 A1* | 12/2016 | Chun .................. | H04W 52/247 |
| 2017/0077999 A1* | 3/2017 | Asterjadhi ........ | H04W 72/0413 |
| 2017/0134187 A1* | 5/2017 | Chen .................... | H04B 7/0617 |
| 2017/0135046 A1* | 5/2017 | Sutskover ........... | H04W 52/343 |
| 2017/0181102 A1* | 6/2017 | Bharadwaj ............ | H04W 84/12 |
| 2017/0188368 A1* | 6/2017 | Cariou ............... | H04L 61/6022 |
| 2017/0257859 A1 | 9/2017 | Li et al. | |
| 2017/0289926 A1* | 10/2017 | Sutskover ........... | H04W 52/325 |
| 2017/0294992 A1* | 10/2017 | Chu .................. | H04W 72/0446 |
| 2017/0303276 A1* | 10/2017 | Cheng .................. | H04L 1/0015 |
| 2017/0325262 A1* | 11/2017 | Tomeba ................ | H04W 74/08 |
| 2018/0020460 A1* | 1/2018 | Hedayat ............... | H04W 52/00 |
| 2018/0077723 A1* | 3/2018 | Adachi ................. | H04L 12/189 |
| 2018/0324697 A1* | 11/2018 | Cariou ................ | H04L 5/0026 |
| 2019/0182864 A1* | 6/2019 | Huang ................ | H04W 74/004 |
| 2019/0268850 A1* | 8/2019 | Kim .................. | H04W 52/0229 |

OTHER PUBLICATIONS

"U.S. Appl. No. 15/282,749, Response filed Jul. 24, 2018 to Non Final Office Action dated Apr. 25, 2018", 12 pgs.
"U.S. Appl. No. 15/282,749, Non Final Office Action dated Nov. 20, 2018", 24 pgs.
"U.S. Appl. No. 15/282,749, response filed Mar. 18, 2019 to Non Final Office Action dated Nov. 20, 2018", 12 pgs.
"U.S. Appl. No. 15/282,749, Notice of Allowance dated Apr. 9, 2019", 10 pgs.

* cited by examiner

SIGNALING FOR UPLINK SOUNDING

PRIORITY CLAIM

This application is a continuation of U.S. patent application Ser. No. 15/282,749, filed Sep. 30, 2016, which claims the benefit of priority under 35 USC 119(e) to U.S. Provisional Patent Application Ser. No. 62/303,415, filed Mar. 4, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to signaling for uplink sounding. Some embodiments relate to methods, computer readable media, and apparatus for signaling for uplink (UL) sounding.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
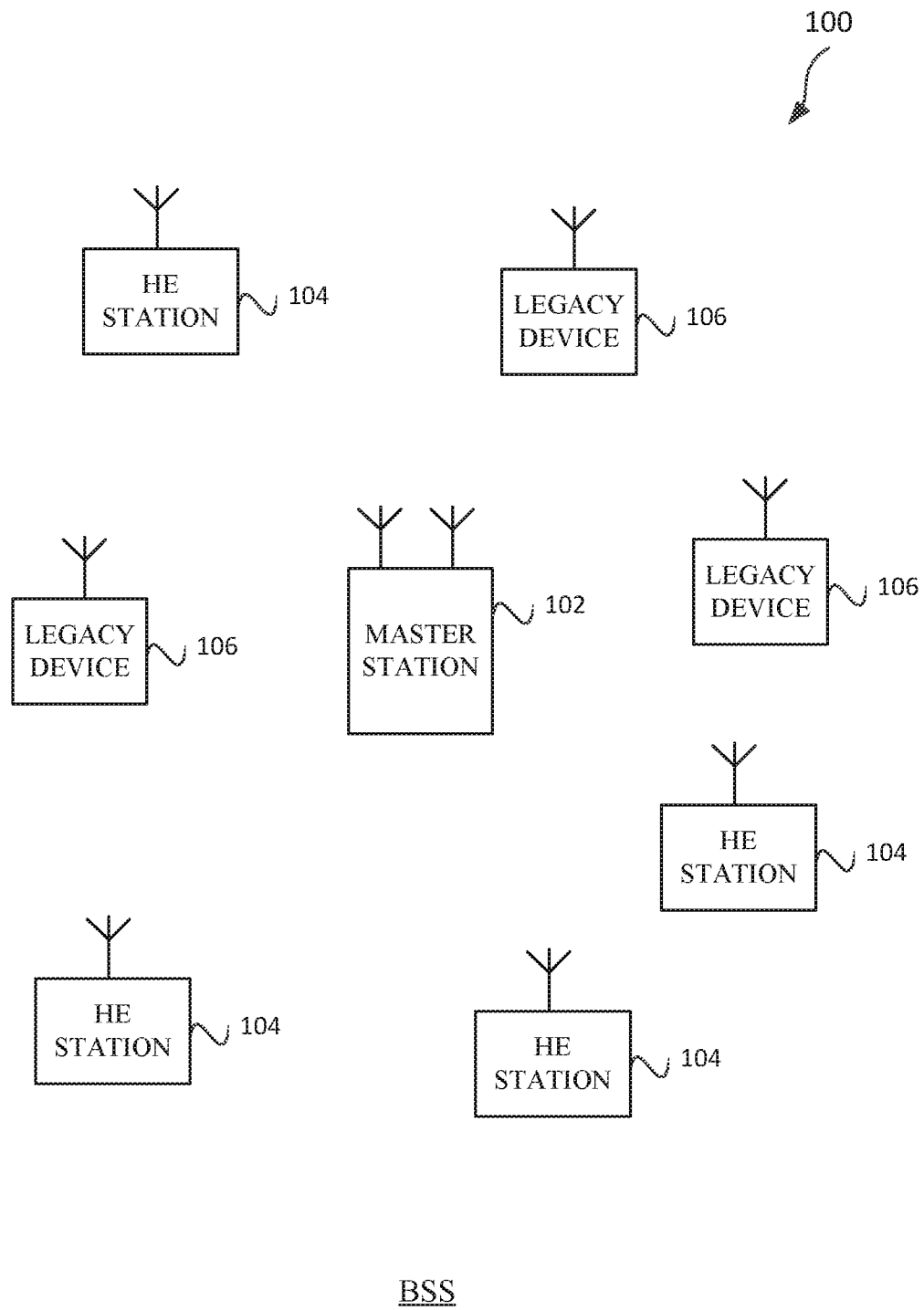
FIG. 1 illustrates a WLAN in accordance with some embodiments.

FIG. 1 illustrates a WLAN 100 in accordance with some embodiments. The WLAN 100 may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU).

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, The 26-subcarrier RU and 52-subcarrier RU are used in the 20 MHz, 40 MHz, 80 MHz, 160 MHz and 80+80 MHz OFDMA HE PPDU formats. The 106-subcarrier RU is used in the 20 MHz, 40 MHz, 80 MHz, 160 MHz and 80+80 MHz OFDMA and MU-MIMO HE PPDU formats. The 242-subcarrier RU is used in the 40 MHz, 80 MHz, 160 MHz and 80+80 MHz OFDMA and MU-MIMO HE PPDU formats. The 484-subcarrier RU is used in the 80 MHz, 160 MHz and 80+80 MHz OFDMA and MU-MIMO HE PPDU formats. The 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the master station 102, HE STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc.

In example embodiments, the HE station 104 and/or the master station 102 are configured to perform the methods and functions described herein in conjunction with FIGS. 1-11.

Figure 2:
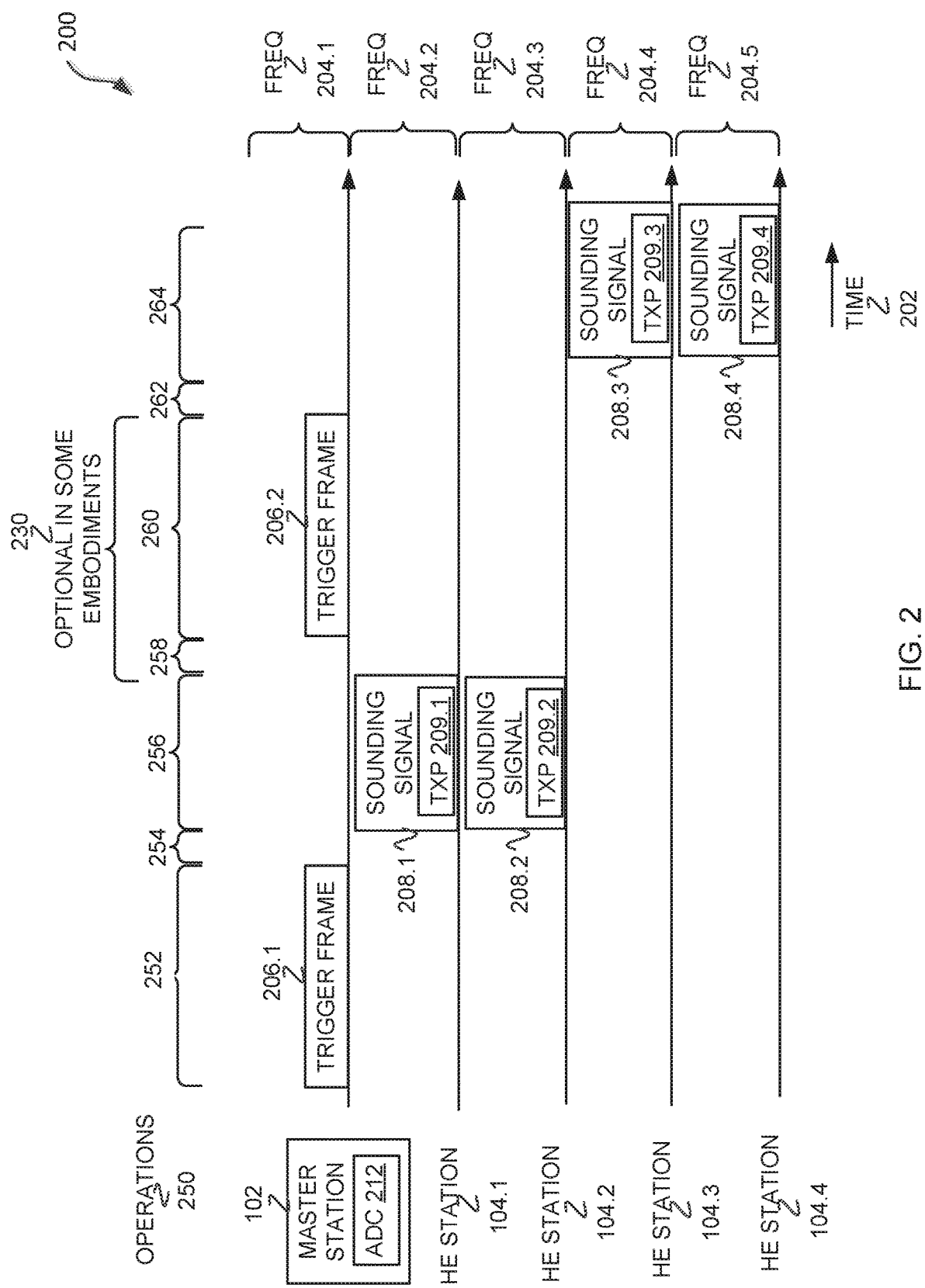
FIG. 2 illustrates a method for signaling for uplink sounding in accordance with some embodiments.

FIGS. 2-7 will be disclosed in conjunction with one another. FIG. 2 illustrates a method 200 for signaling for uplink sounding in accordance with some embodiments. Illustrated in FIG. 2 master station 102, HE stations 104, time 202 along a horizontal axis, frequency 204 along a vertical axis, and operation 250 along the top. The frequency 204 may be a bandwidth of the wireless medium. The frequencies 204 may overlap. For example, HE station 104.1 and HE station 104.2 may transmit on the same frequency using MU-MIMO. Additionally, one or more of the HE stations 104 may transmit on the same frequency 204 or an overlapping frequency 204 in responding to the master station 102. The master station 102 may include an analog-to-data converter (ADC) 212.

The method 200 begins at operation 252 with the master station 102 transmitting trigger frame 206.1. The master station 102 may have contended for the wireless device prior to transmitting the trigger frame 206.1. The trigger frame 206.1 may be a trigger frame 300.

Figure 3:
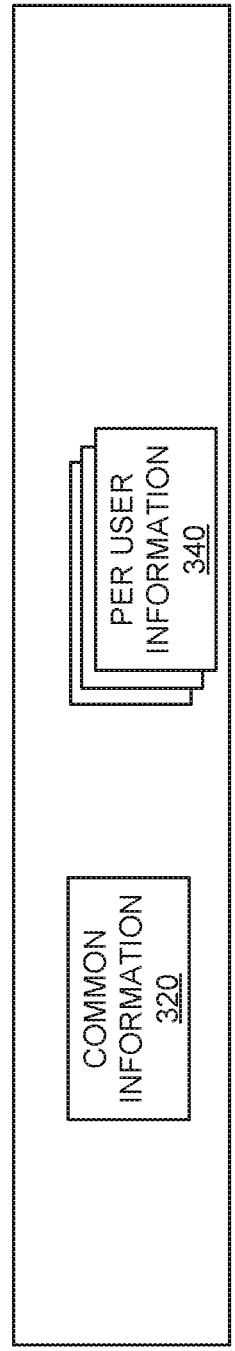
FIG. 3 illustrates a trigger frame for uplink sounding in accordance with some embodiments.

FIG. 3 illustrates a trigger frame 300 for uplink sounding in accordance with some embodiments. Trigger frame 300 includes one or more of the following fields common information 320 and per user information 340. The common information 320 includes fields that are common to all the users addressed in the trigger frame 300. The per user information 340 includes one or more fields that are particular for a user that is identified.

Figure 4:
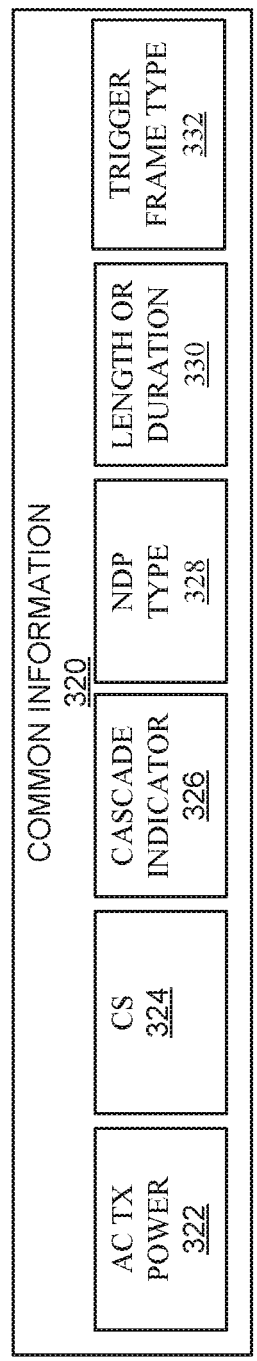
FIG. 4 illustrates a common information field of a trigger frame in accordance with some embodiments.
Figure 5:
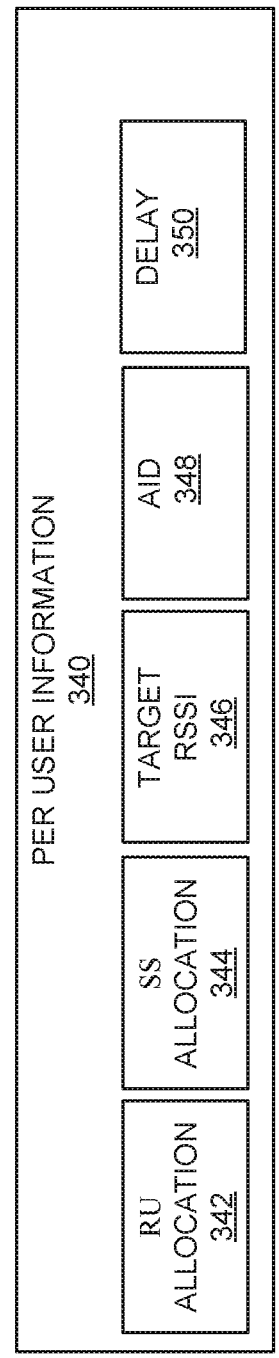
FIG. 5 illustrates per user information for a trigger frame in accordance with some embodiments.

FIG. 4 illustrates a common information 320 field of a trigger frame 400 in accordance with some embodiments. FIG. 5 illustrates per user information 340 for a trigger frame 300 in accordance with some embodiments.

The common information 320 may include an access point (AP) transmit (TX) power 322, a carrier sense (CS) required 324, a cascade indicator 326, an NDP type 328, a length or duration 330, and a trigger frame type 332. The AC TX power 322 may indicate a transmission power used to transmit the trigger frame 400. The AC TX power 322 may indicate the TX power as the power ratio in decibels (dB) of the measured power referenced to one milliwatt (mW)

(dBm.) The CS required 324 indicates whether the user is to perform a CS before transmitting a response. The cascade indicator 326 indicates whether a subsequent trigger frame 300 is to be transmitted. The NDP type 328 may indicate parameters for responding. The NDP type 328 may indicate that a HE preamble symbol duration that should be used, e.g., 3.2 μs (1× long-training field (LTF)), 6.4 μs (2×LTF), or 12.8 μs (4×LTF). The NDP type 328 may indicate that a legacy NDP should be transmitted, e.g., an IEEE 802.11ac NDP format, or an IEEE 802.11n NDP format. In some embodiments, the NDP type 328 may be two fields one to indicate the symbol duration and another to indicate the type of NDP to use. In addition, the NDP type 328 may indicate the P-matrix size e.g. 1×1, 2×2, 4×4, 6×6, and 8×8. The P-matrix is used for multiplexing the LTF symbols of multiple spatial streams. The length or duration 330 may indicate a length or duration for the response to the trigger frame. In some embodiments, the length or duration 330 may indicate the trigger frame is for an uplink sounding by indicating there is no length or duration 330 for data. The trigger frame type 332 may indicate a type of trigger frame which may include uplink sounding.

The per user information 340 may include resource unit (RU) allocation 342, spatial stream (SS) allocation 344, target received signal strength indicator (RSSI) 346, association identification (AID) 348, and a delay 350. The RU allocation 342 may be an indication of a bandwidth and location of the bandwidth. The SS allocation 344 may be an indication of a SS allocation for the RU allocation 342. In some embodiments, the RU allocation 342 and SS allocation 344 fields may be merged.

The target RSSI 346 may be a target power for the user to transmit a packet to the transmitter of the trigger frame 300. In some embodiments, target RSSI 346 may be part of the common information 320. The AID 348 may be an identification of the user that the user recognizes as identifying the user. For example, the AID 348 may be an identification that was sent to the user when the user associated with the AP. The delay 350 may indicate when a user should transmit the sounding signal. For example, the delay 350 may indicate a duration to wait or a number of other groups of users that are to transmit before the user.

The trigger frame 206.2 may include a cascade indicator 326 that indicates there is a subsequent trigger frame to be transmitted, e.g., trigger frame 206.2.

Returning to method 200, trigger frame 206.1 may include one or more of the fields disclosed in conjunction with FIG. 3, e.g. an RU allocation 342 and SS allocation 344 for HE station 104.1 and HE station 104.2. The method 200 continues at operation 254 with HE station 104.1 and HE station 104.2 waiting a period of time before transmitting. For example, HE station 104.1 and HE station 104.2 may wait a short interframe space (SIFS).

In some embodiments, the HE stations 104 perform a clear channel assessment (CCA) prior to transmitting the sounding signal 208. If the CCA indicates the wireless medium (e.g., the wireless medium indicated by the RU 342) is idle, then the HE station 104 will transmit the sounding signal 208. If the CCA indicates the wireless medium is busy, then the HE station 104 may defer until the wireless medium indicates idle or may not transmit the sounding signal 208.

The method 200 continues at operation 256 with the HE stations 104 transmitting sounding signals 208. The sounding signals 208 include a transmit power (TXP) 209, which is the transmit power used to transmit the sounding signal 208 and not a field of the sounding signal 208.

In some embodiments, the HE stations 104 may determine the TXP 209 to be the TXP for the highest modulation and coding scheme (MCS) for an uplink with the master station 102. The HE stations 104 may determine an uplink path loss based on an AC TX power 322 and a received power of the trigger frame 206. For example, the path loss may be the AC TX power 322 minus the received power of the trigger frame 206. The AC TX power 322 may be for a portion of the trigger frame 206, e.g., the payload or media access control (MAC) portion. The MCSs may have error vector magnitude (EVM) requirements with higher MCSs permitting smaller EVMs. The HE stations 104 then transmit the sounding signal 208 with the TXP 209 set to the TXP that the HE stations 104 would use to transmit a packet to the master station 102 using the highest MCS the HE station 104 could use with the master station 102. In some embodiments, a reliability parameter may be the EVM and indicate that the communications must stay within an EVM requirement for a predetermined portion of the communication. In some embodiments, the highest MCS is the one that achieves the highest data rate for the specific uplink. For example, the highest MCS the device can encode is MCS7 but the uplink may only support up to MCS5 due to path loss. The highest MCS for this example uplink is then MCS5 and not MCS7.

The HE station 104 may be constrained in how high the TXP 209 may be based on regulatory standards (which may be based on the RU 342). The HE station 104 may be constrained in how high the TXP 209 may be based on another communication protocol being co-located with the HE station 104, e.g., BlueTooth™. The HE station 104 may be constrained in how high the TXP 209 may be based on physical limits of the HE station 104, e.g. maximum output power of the power amplifier. In this embodiment, the master station 102 may be able to measure the highest usable powers for the highest MCSs of the HE stations 104 based on the received power at the master station 102.

Figure 6:
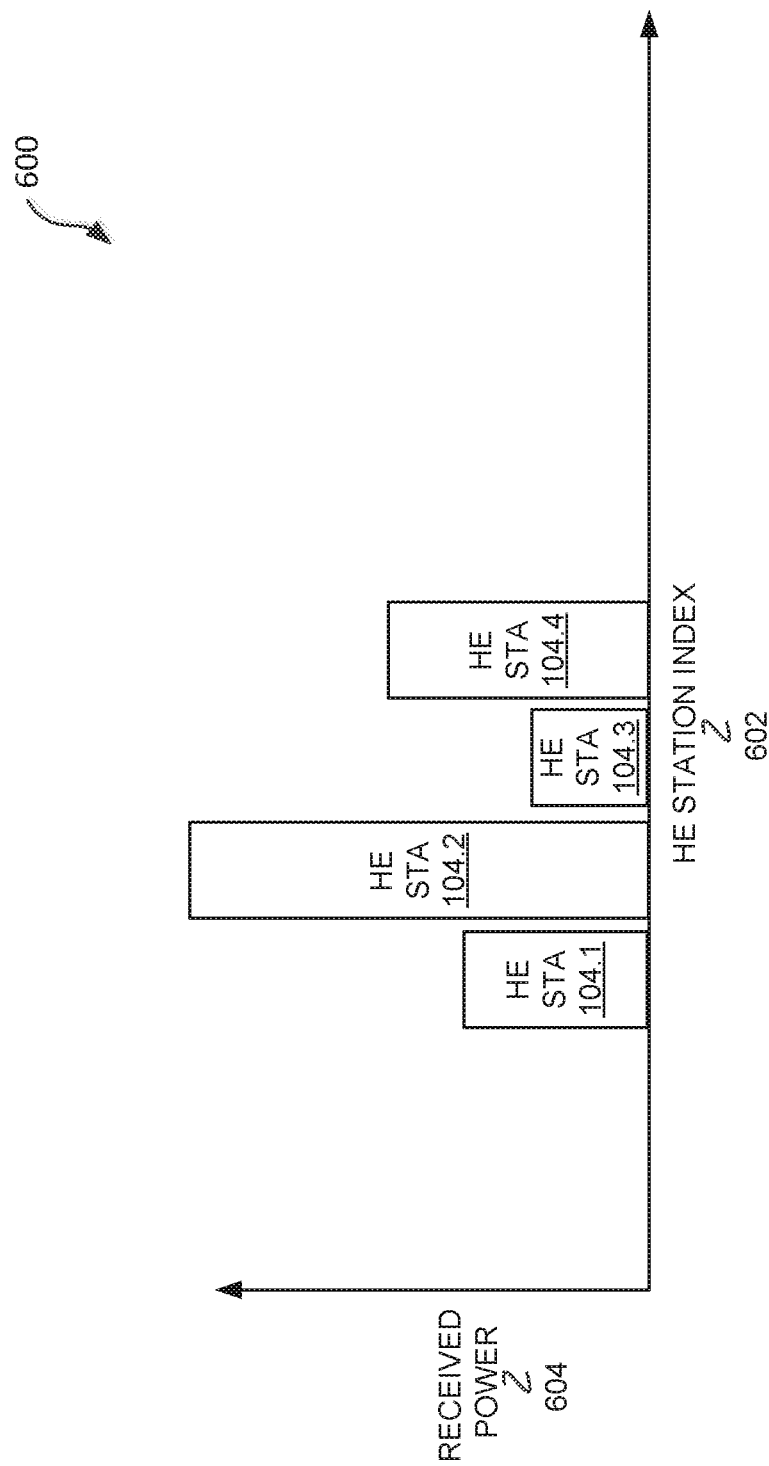
FIG. 6 illustrates an example of received signal strength by the master station in accordance with some embodiments.

The master station 102 may receive the sounding signal 208. FIG. 6 illustrates an example 600 of received signal strength by the master station 102 in accordance with some embodiments. Illustrated in FIG. 6 is HE station index 602 along a horizontal axis, and received power 604 along a vertical axis. The embodiment where the HE stations 104 determine the TXP 209 to be the TXP for the highest MCS for an uplink with the master station 102 may result in signal strengths 604 as illustrated in FIG. 6. ADC 212 of the master station 102 may have difficulty determining the received power 604 for each of the HE stations 104 because of the large difference in received power 604. The large difference in received power 604 may result from large difference in path loss from the master station 102 to HE stations 104. The power difference between the best and worst RE station 104 may cause underflow or overflow of the ADC 212 and the output of a Fast Fourier Transform (FFT) of the master station 102. For example, received power 604 difference between HE station 104.2 and HE station 104.1 may be too great for the ADC 212.

In some embodiments, the HE stations 104 may determine the TXP 209 to be a highest power under regulation limits, co-location limits, and physical limits. The master station 102 may receive the sounding signal 208. In this embodiment, the power difference between the best and worst HE station 104 may cause underflow or overflow of the ADC 212 and the output of a FFT of the master station 102. For example, returning to FIG. 6, received power 604 difference between HE station 104.2 and HE station 104.1 may be too great for the ADC 212.

In some embodiments, the master station 102 may specify a target for the received power of the sounding signal 208, e.g., target RSSI 346. In some embodiments, the HE stations 104 determine the TXP 209 by assuming a path loss is reciprocal for downlink and uplink. The HE stations 104 calculate the path loss based on the received power of the trigger frame 206 and an AC TX power 322. The TXP 209 is then the minimum of the TXP for highest MCS usable with the master station 102 and the target received power plus the path loss determined from the trigger frame 206. The HE station 104 transmitting at a TXP 209 to have a same received power at the master station 102 may result in the ADC 212 and FFT of the master station 102 not overflowing.

Figure 7:
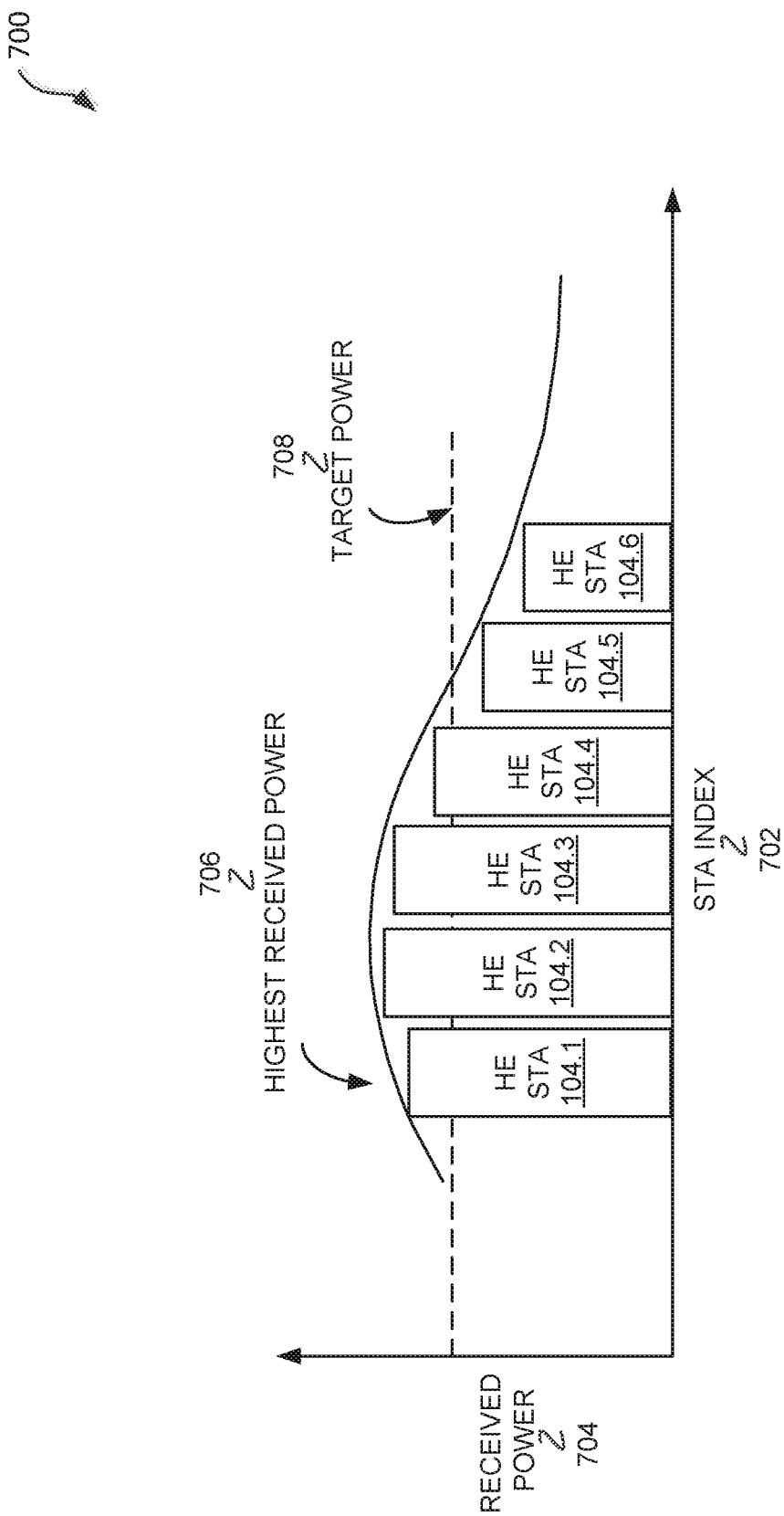
FIG. 7 illustrates an example of received signal strength by the master station in accordance with some embodiments.

The master station 102 may receive the sounding signal 208. FIG. 7 illustrates an example 700 of received signal strength by the master station 102 in accordance with some embodiments. Illustrated in FIG. 7 is HE station index 702 along a horizontal axis, received power 704 along a vertical axis, a curve of highest received power 706, and a target power 708. FIG. 7 may illustrate received power 704 for an embodiment where the HE stations 104 try to reach a target power 708, e.g., target RSSI 346. The master station 102 may need to set a low received power 704 target so that each HE station 104 may come close to the target power 708.

The master station 102 may not know what additional power is available to each of the HE station 104 because of the low setting of the target power 708. For example, in FIG. 7, HE station 104.2 may be able to transmit at a higher power and potentially use a higher MCS. The master station 102 may perform a new sounding with the HE stations 104.2 that had a received power 704 greater than the target power 708 with a higher target power 708 to determine more information regarding available powers for the HE stations 104.2.

In some embodiments, the master station 102 may determine path losses of the HE stations 104 using the sounding signal 208.

Returning to method 200, the method 200 may continue with the master station 102 waiting a duration 258 before transmitting a second trigger frame 206.2. For example, the master station 102 may wait a SIFS duration. The second trigger frame 206.2 may include one or more of the fields disclosed in conjunction with FIG. 3, e.g. an RU allocation 342 and SS allocation 344 for HE station 104.3 and HE station 104.4. The second trigger frame 206.2 may include a cascade indicator 326 that indicates there is not a subsequent trigger frame 206 is to be transmitted.

The method 200 continues at operation 262 with HE station 104.3 and HE station 104.4 waiting a period of time before transmitting. For example, HE station 104.3 and HE station 104.4 may wait a SIFS. The method 200 continues at operation 264 with HE station 104.3 and HE station 104.4 transmitting sounding signal 208.3 and sounding signal 208.4, respectively, with TXP 209.3 and TXP 209.4, respectively. Operations 260, 262, and 264 may be the same or similar as operations 252, 254, and 256.

In some embodiments, the TXP 209 is a target receive power density and may be part of a common field. In some embodiments, the TXP 209 is normalized. For example, the RU allocation 342 may be 20 MHz and a nominal bandwidth may be 80 MHz. The HE station 104 may reduce TXP 209 proportionally for the 20 MHz bandwidth. In some embodiments, the TXP 209 is a target receive power density and may be part of a common field.

In some embodiments, operations 258 and 260 are optional. The trigger frame 206.1 may include RU allocation 342 and SS allocation 344 for HE station 104.1, HE station 104.2, HE station 104.3, and HE station 104.4. In these embodiments, the trigger frame 206.1 includes an indication of when the HE stations 104 should transmit the sounding signals 208. For example, trigger frame 206.1 may include delay 350 that indicates that HE station 104.3 and HE station 104.4 are to wait to transmit in a second group of HE stations 104. HE station 104.3 and HE station 104.4 may determine the time to wait based on a length or duration in the trigger frame 206.1 and the time to wait in operations 254 and 262.

Figure 8:
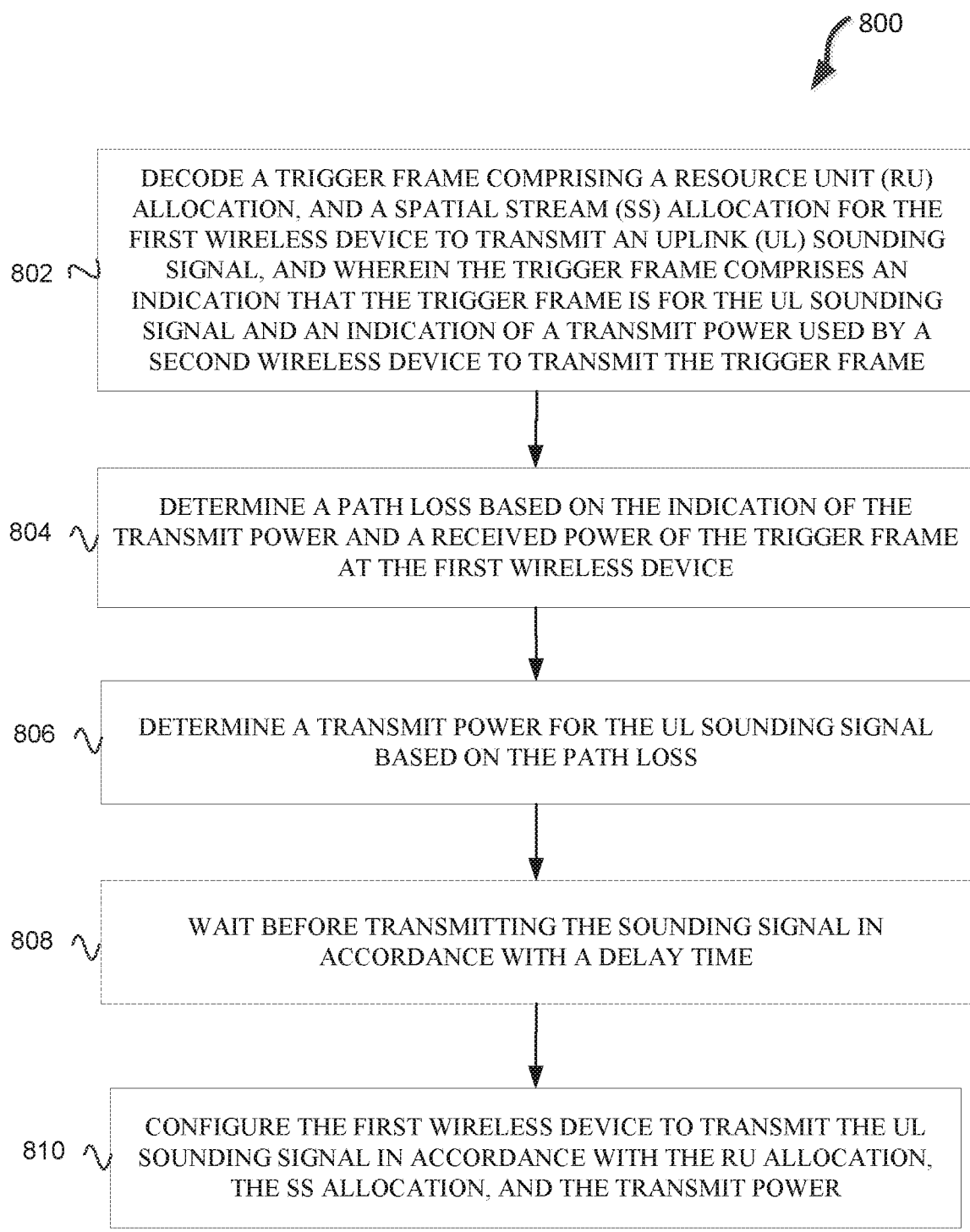
FIG. 8 illustrates a method for signaling for uplink sounding in accordance with some embodiments.

FIG. 8 illustrates a method 800 for signaling for uplink sounding in accordance with some embodiments. The method 800 begins at operation 802 with decoding a trigger frame comprising a RU allocation, and a SS allocation for the first wireless device to transmit an UL sounding signal, and wherein the trigger frame comprises an indication that the trigger frame is for the UL sounding signal and an indication of a transmit power used by a second wireless device to transmit the trigger frame.

For example, an apparatus of HE stations 104.1 and 104.2 may decode trigger frame 206.1 which may include RU allocation 342, SS allocation 344, trigger frame type 332, and AC TX power 322.

The method 800 continues at operation 904 with determining a path loss based on the indication of the transmit power and a received power of the trigger frame at the first wireless device.

For example, an apparatus of HE station 104.1 may determine a path loss from the master station 102 to the HE station 104.1 based on an AC TX power 322 of trigger frame 206.1 and a received power of the trigger frame 206.1 by the HE station 104.1.

The method 800 continues at operation 806 with determining a transmit power for the UL sounding signal based on the path loss. For example, the trigger frame may further comprises a target RSSI 346 for the sounding signal, and an apparatus of HE station 104.1 may determine the transmit power for the sounding signal based on the path loss so that the sounding signal will be received by the second wireless device with the target receive power.

In another embodiment, an apparatus of the HE station 104.1 may determine the transmit power to be a power below a limit but large enough for a highest MCS the first wireless device is able to use to encode a packet to transmit to the second wireless device. The limit may be a regulatory transmission limit for the RU allocation or a co-location transmission limit. The apparatus may determine the highest MCS the first wireless device is able to use based on an estimated EVM of a packet encoded with the highest MCS to be received at the second wireless device.

Optionally, the method 800 continues at operation 808 with waiting before transmitting the sounding signal. The trigger frame may include a field to indicate a delay time. For example, trigger frame 206.1 may include delay 350. The delay 350 may indicate a time for the HE station 104 to delay prior transmitting the sounding signal.

The method 800 continues at operation 810 with configure the first wireless device to transmit the UL sounding signal in accordance with the RU allocation, the SS allocation, and the transmit power. For example, an apparatus of HE station 104.1 may configure HE station 104.1 to transmit the sounding signal in accordance with RU allocation 342, SS allocation 344, and the transmit power for the sounding signal that was determined in a previous operation.

The sounding signal may be transmitted in accordance with one or both of OFDMA or MU-MIMO. For example, if the RU allocation is 20 MHz and the SS allocation indicates two spatial streams then the HE station 104.1 may transmit in accordance with both OFDMA and MU-MIMO.

If the RU allocation indicates a full bandwidth (e.g., 160 MHz), and the SS allocation indicates two spatial streams then the HE station 104.1 may transmit in accordance with MU-MIMO. If the RU allocation indicates 20 MHz and the SS allocation indicates just one spatial stream for the RU allocation, then the HE station 104.1 may transmit in accordance with OFDMA only.

Figure 9:
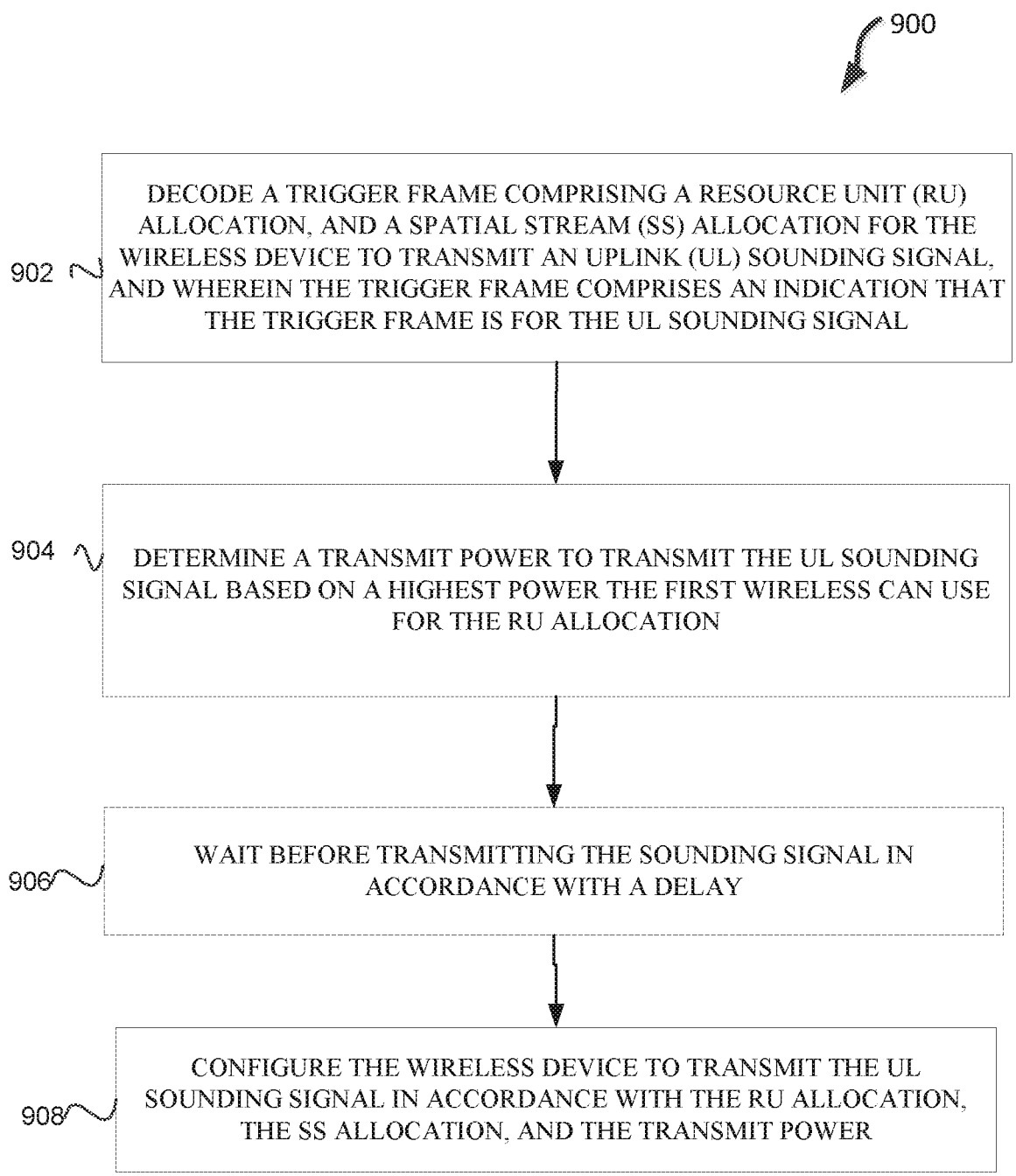
FIG. 9 illustrates a method for signaling for uplink sounding in accordance with some embodiments.

FIG. 9 illustrates a method 900 for signaling for uplink sounding in accordance with some embodiments. The method 900 begins at operation 902 with decode a trigger frame comprising a RU allocation, and a SS allocation for the wireless device to transmit an UL sounding signal, and wherein the trigger frame comprises an indication that the trigger frame is for the UL sounding signal.

For example, an apparatus of HE station 104.1 may decode trigger frame 206.1 which may include RU allocation 342, SS allocation 344, and trigger frame type 332.

The method 900 may continue at operation 904 with determine a transmit power to transmit the UL sounding signal based on a highest power the first wireless can use for the RU allocation.

For example, an apparatus of HE station 104.1 may determine a highest power that HE station 104.1 may transmit a packet based on regulatory limits for the RU allocation 342, and, optionally, based on co-located other wireless communication protocols, e.g. BlueTooth™.

Optionally, the method 900 continues at operation 906 with waiting before transmitting the sounding signal in accordance with a delay. The trigger frame may include a field to indicate a delay. For example, trigger frame 206.1 may include delay 350. The delay 350 may indicate a time for the HE station 104 to delay prior transmitting the sounding signal, e.g. a group number.

For example, HE station 104.3 may receive a delay 350 that indicates it is in a second group of HE stations 104.3 to transmit the sounding signal. HE station 104.3 can determine how long to wait based on the times to wait operations 254 and 262 and a length or duration of the sounding signal 208. The delay 350 may indicate how long the HE station 104 is to wait in other ways.

The method 900 continues at operation 908 with configure the wireless device to transmit the UL sounding signal in accordance with the RU allocation, the SS allocation, and the transmit power.

For example, an apparatus of HE station 104.1 may configure HE station 104.1 to transmit the sounding signal 208.1 with TXP 209.1 in accordance with the determined transmit power and in accordance with RU allocation and SS allocation.

Figure 10:
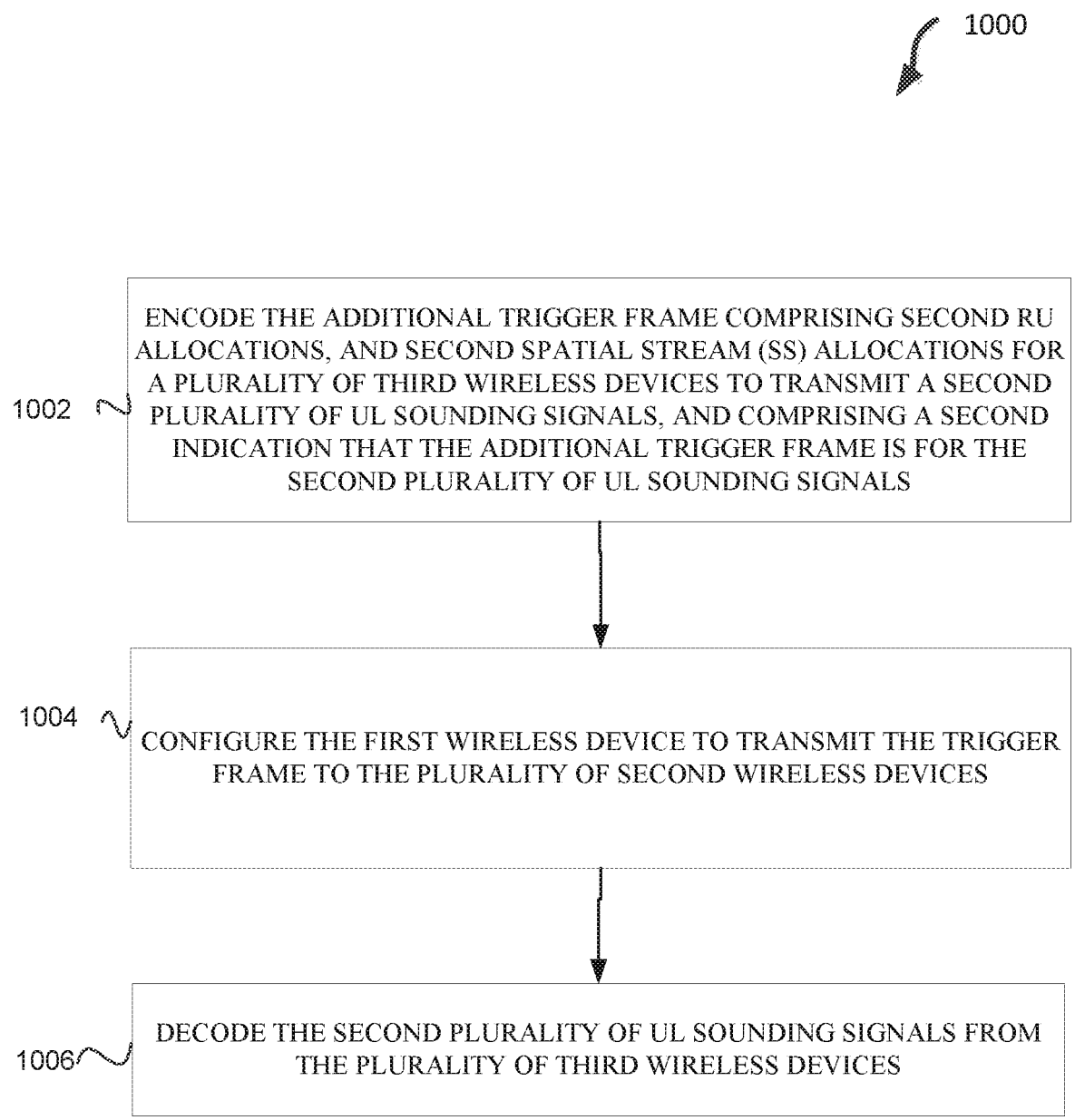
FIG. 10 illustrates a method for signaling for uplink sounding in accordance with some embodiments.

FIG. 10 illustrates a method 1000 for signaling for uplink sounding in accordance with some embodiments. The method 1000 begins at operation 1002 with encoding the additional trigger frame comprising second RU allocations, and second spatial stream (SS) allocations for a plurality of third wireless devices to transmit a second plurality of UL sounding signals, and comprising a second indication that the additional trigger frame is for the second plurality of UL sounding signals.

For example, master station 102 may encode trigger frame 206.1 to include RU allocations, SS allocations 344, AIDs 348 (of the plurality of second wireless devices), and trigger frame type 332 (or length or duration 330 when the trigger frame type is indicated by a length or duration that indicates the trigger frame is for UL sounding. In some embodiments, the trigger frame may include one or more of an AC TX power 322, a CS 324, a cascade indicator 326, an NDP type 328, a target RSSI 346, or a delay 350.

The method 1000 may continue at operation 1004 with configuring the first wireless device to transmit the additional trigger frame to the plurality of third wireless devices. For example, an apparatus of the master station 102 may configure the master station 102 to transmit the trigger frame 206.1 to the HE stations 104.1, 104.2, 104.3, and 104.4.

The method 1000 may continue at operation 1006 with decoding the second plurality of UL sounding signals from the plurality of third wireless devices.

For example, an apparatus of the master station 102 may decode sounding signals 208 from HE station 104.1 and HE station 104.2.

In some embodiments, the apparatus of the master station 102 is configured to indicate a delay for each of the plurality of second wireless devices to transmit the UL sounding signals, where the delay is a same first delay for a first one or more of the plurality of second wireless devices and a same second delay for a second one or more of the plurality of second wireless devices.

For example, master station 102 may indicate a first delay (delay 350) for HE station 104.1 and HE station 104.2 and a second delay (delay 350) for HE stations 104.3 and HE stations 104.4.

In some embodiments, the trigger frame comprises a cascade field that indicates an additional trigger is to be transmitted. For example, an apparatus of master station 102 may indicate that cascade indicator 326 is true for trigger frame 206.1 and that cascade indicator 326 is false for trigger frame 206.2.

In some embodiments, the master station 102 may be configured to select a second plurality of second wireless devices of the plurality of second wireless devices with a receive signal strength of the sounding signal above a threshold for an additional trigger frame, and encode an additional trigger frame comprising second RU allocations, and second SS allocations for the second plurality of second wireless devices to transmit a second plurality of UL sounding signals. For example, master station 102 may receive sounding signals 208 as disclosed in conjunction with FIG. 7. The master station 102 may select HE stations 104.1 through 104.4 because the received power of these sounding signals 208 is higher than the target power 708. The master station 102 may then transmit an additional trigger frame to HE stations 104.1 through 104.4 with a higher target power 708 to determine the head room or the additional power that HE stations 104.1 through 104.4 can use to transmit to the master station 102. The master station 102 may repeat this method with a higher target power 708.

Figure 11:
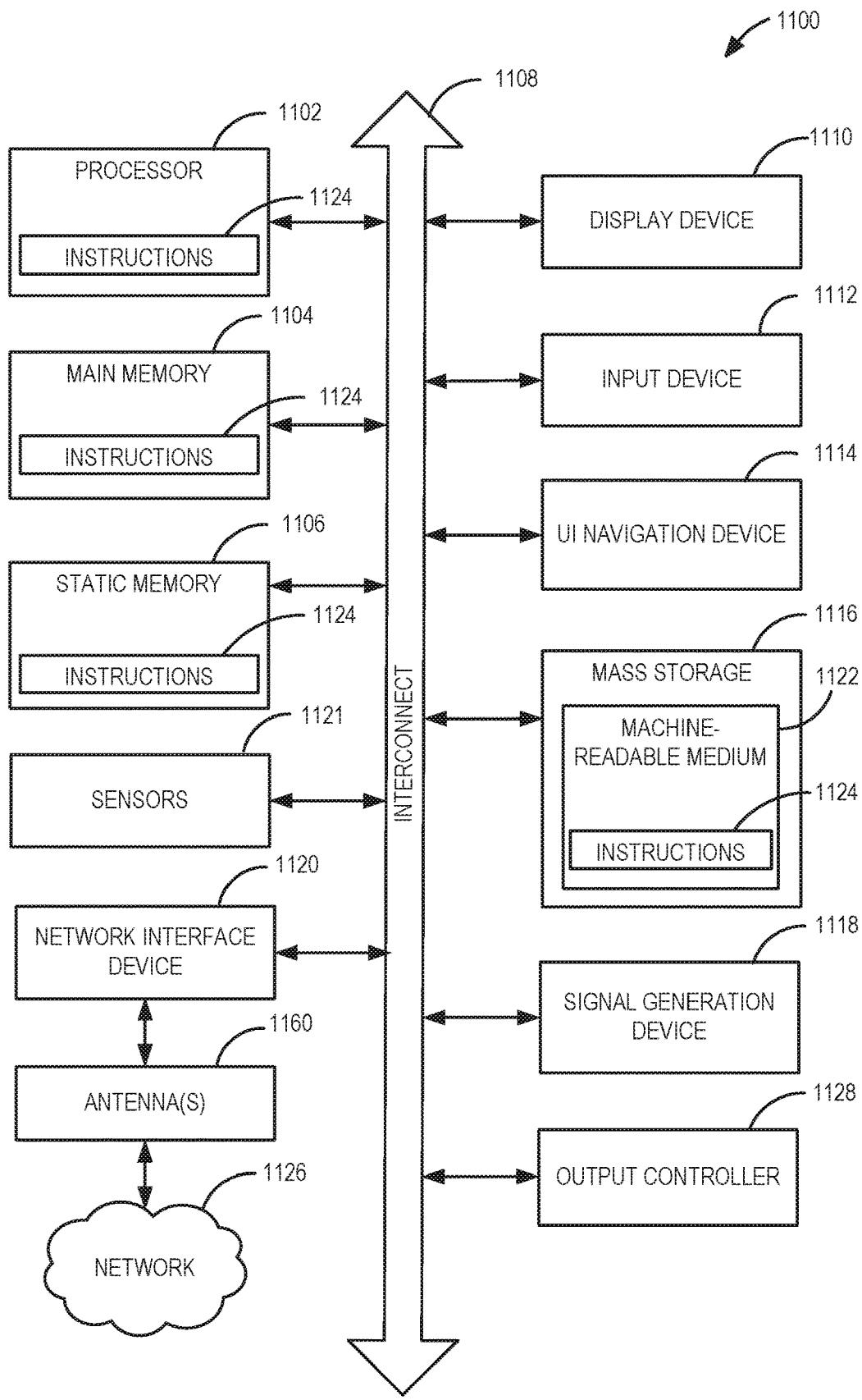
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1102 and/or instructions 1124 may comprise processing circuitry and/or transceiver circuitry.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a first wireless device, the apparatus including: memory; and processing circuitry coupled to the memory, the processing circuitry configured to: decode a trigger frame including a resource unit (RU) allocation, and a spatial stream (SS) allocation for the first wireless device to transmit an uplink (UL) sounding signal, and wherein the trigger frame comprises an indication that the trigger frame is for the UL sounding signal and an indication of a transmit power used by a second wireless device to transmit the trigger frame; determine a path loss based on the indication of the transmit power and a received power of the trigger frame at the first wireless device; determine a transmit power for the UL sounding signal based on the path loss; and configure the first wireless device to transmit the UL sounding signal in accordance with the RU allocation, the SS allocation, and the transmit power.

In Example 2, the subject matter of Example 1 optionally includes wherein the trigger frame further comprises a target receive power for the UL sounding signal, and wherein the processing circuitry is further configured to: determine the transmit power for transmission of the UL sounding signal based on the path loss so that the UL sounding signal will be received by the second wireless device with the target receive power.

In Example 3, the subject matter of Example 2 optionally includes wherein processing circuitry is further configured to: normalize the target receive power in accordance with a bandwidth of the RU allocation, wherein the target receive power is a target receive power density.

In Example 4, the subject matter of any one or more of Examples 1-3 optionally include wherein the processing circuitry is further configured to: determine the transmit power to be a power below a limit but large enough for a highest modulation and coding scheme (MCS) the first wireless device is able to use to encode a packet to transmit to communicate with the second wireless device within a reliability parameter.

In Example 5, the subject matter of Example 4 optionally includes wherein the limit is a regulatory transmission limit for the RU allocation, a co-location transmission limit, or a power amplifier limit.

In Example 6, the subject matter of any one or more of Examples 4-5 optionally include wherein the processing circuitry is further configured to: determine the highest MCS the first wireless device is able to use based on an estimated error vector magnitude (EVM) of a packet to be received at the second wireless device, wherein the packet is to be encoded with the highest MCS.

In Example 7, the subject matter of any one or more of Examples 1-6 optionally include wherein the trigger frame comprises a carrier sense field to indicate if the first wireless device is to perform a clear channel analysis (CCA) before transmitting the UL sounding signal, and wherein the processing circuitry is configured to: if the carrier sense field indicates that a CCA is to be performed before transmitting the UL sounding signal, perform a clear channel analysis (CCA) on the RU allocation, and if the CCA indicates the RU allocation is idle, configure the first wireless device to transmit the UL sounding signal in accordance with the RU allocation, the SS allocation, and the transmit power.

In Example 8, the subject matter of any one or more of Examples 1-7 optionally include wherein the UL sounding signal is a null data packet (NDP).

In Example 9, the subject matter of any one or more of Examples 1-8 optionally include wherein the trigger frame indicates that the trigger frame is for the UL sounding signal based on a length or duration field of the trigger frame that indicates there is no length or duration for data, or based on a trigger frame type field.

In Example 10, the subject matter of any one or more of Examples 1-9 optionally include wherein the trigger frame indicates the UL sounding signal is to be one from the following group: an high efficiency (HE) preamble symbol duration of 3.2 μs (1× long-training field (LTF)), a HE preamble symbol duration of 6.4 μs (2×LTF), a HE preamble symbol duration of 12.8 μs (4×LTF), a legacy NDP, an Institute of Electrical and Electronic Engineers (IEEE) 802.11ac NDP format, or an IEEE 802.11n NDP.

In Example 11, the subject matter of any one or more of Examples 1-10 optionally include wherein the trigger frame further comprises a delay time that indicates how long the first wireless device is to wait before transmitting the UL sounding signal in accordance with the RU allocation and the SS allocation.

In Example 12, the subject matter of Example 11 optionally includes wherein one or more additional wireless devices are to transmit UL sounding signals before the delay time.

In Example 13, the subject matter of any one or more of Examples 1-12 optionally include wherein the processing circuitry is further configured to: determine a transmit power to transmit the UL sounding signal based on the path loss and further based on a bandwidth of the RU allocation.

In Example 14, the subject matter of any one or more of Examples 1-13 optionally include wherein the trigger frame indicates that no acknowledgment of the UL sounding signal is to be transmitted by the second wireless device.

In Example 15, the subject matter of any one or more of Examples 1-14 optionally include wherein the processing circuitry is further configured to: configure the first wireless device to transmit the UL sounding signal in accordance with the RU allocation, the SS allocation, and the transmit power, and in accordance with one or both of orthogonal frequency division multi-access (OFDMA) or multi-user multiple-input multi-output (MU-MIMO).

In Example 16, the subject matter of any one or more of Examples 1-15 optionally include wherein the first wireless device is one from the following group: an Institute of Electrical and Electronic Engineers (IEEE) 802.11ax access point, an IEEE 802.11ax station, an IEEE 802.11 station, and an IEEE 802.11 access point.

In Example 17, the subject matter of any one or more of Examples 1-16 optionally include transceiver circuitry coupled to the processing circuitry.

In Example 18, the subject matter of Example 17 optionally includes one or more antennas coupled to the transceiver circuitry.

Example 19 is a non-transitory computer-readable storage medium that stores instructions for execution by one or more processors, the instructions to configure the one or more processors to cause an apparatus of a first wireless device to: decode a trigger frame including a resource unit (RU) allocation, and a spatial stream (SS) allocation for the first wireless device to transmit an uplink (UL) sounding signal, and wherein the trigger frame comprises an indication that the trigger frame is for the UL sounding signal and an indication of a transmit power used by a second wireless device to transmit the trigger frame; determine a path loss based on the indication of the transmit power and a received power of the trigger frame at the first wireless device; determine a transmit power for the UL sounding signal based on the path loss; and configure the first wireless device to transmit the UL sounding signal in accordance with the RU allocation, the SS allocation, and the transmit power.

In Example 20, the subject matter of Example 19 optionally includes wherein the instructions further configure the one or more processors to cause the apparatus to: determine the transmit power for transmission of the UL sounding signal based on the path loss so that the UL sounding signal will be received by the second wireless device with a target receive power, wherein the trigger frame further comprises the target receive power for the UL sounding signal.

Example 21 is a method performed by a first wireless device, the method including: decode a trigger frame including a resource unit (RU) allocation, and a spatial stream (SS) allocation for the first wireless device to transmit an uplink (UL) sounding signal, and wherein the trigger frame comprises an indication that the trigger frame is for the UL sounding signal and an indication of a transmit power used by a second wireless device to transmit the trigger frame; determine a path loss based on the indication of the transmit power and a received power of the trigger frame at the first wireless device; determine a transmit power for the UL sounding signal based on the path loss; and configure the first wireless device to transmit the UL sounding signal in accordance with the RU allocation, the SS allocation, and the transmit power.

In Example 22, the subject matter of Example 21 optionally includes wherein the trigger frame further comprises a target receive power for the UL sounding signal, and wherein the method further comprises: determining the transmit power for transmission of the UL sounding signal based on the path loss so that the UL sounding signal will be received by the second wireless device with the target receive power.

Example 23 is an apparatus of a wireless device, the apparatus including: memory; and processing circuitry coupled to the memory, the processing circuitry configured to: decode a trigger frame including a resource unit (RU) allocation, and a spatial stream (SS) allocation for the wireless device to transmit an uplink (UL) sounding signal, and wherein the trigger frame comprises an indication that the trigger frame is for the UL sounding signal; determine a transmit power to transmit the UL sounding signal based on a highest power the first wireless can use for the RU allocation; and configure the wireless device to transmit the UL sounding signal in accordance with the RU allocation, the SS allocation, and the transmit power.

In Example 24, the subject matter of Example 23 optionally includes wherein the highest power is based on one of the following group: a regulatory highest power for the RU allocation and a co-located wireless communication protocol highest power.

Example 25 is an apparatus of a first wireless device, the apparatus including: memory; and processing circuitry coupled to the memory, the processing circuitry configured to: encode a trigger frame including resource unit (RU) allocations, and spatial stream (SS) allocations for a plurality of second wireless devices to transmit a plurality of uplink (UL) sounding signals, and including an indication that the trigger frame is for the plurality of UL sounding signals; configure the first wireless device to transmit the trigger frame to the plurality of second wireless devices; and decode the plurality of UL sounding signals from the plurality of second wireless devices.

In Example 26, the subject matter of Example 25 optionally includes wherein the trigger frame further comprises an indication of a delay for each of the plurality of second wireless devices to transmit the UL sounding signals, and wherein the delay is a same first delay for a first one or more of the plurality of second wireless devices and a same second delay for a second one or more of the plurality of second wireless devices.

In Example 27, the subject matter of any one or more of Examples 25-26 optionally include wherein the trigger frame comprises a cascade field that indicates an additional trigger frame is to be transmitted and wherein the processing circuitry is further configured to: encode the additional trigger frame including second RU allocations, and second spatial stream (SS) allocations for a plurality of third wireless devices to transmit a second plurality of UL sounding signals, and including a second indication that the additional trigger frame is for the second plurality of UL sounding signals; configure the first wireless device to transmit the additional trigger frame to the plurality of third wireless devices; and decode the second plurality of UL sounding signals from the plurality of third wireless devices.

In Example 28, the subject matter of any one or more of Examples 25-27 optionally include wherein the trigger frame further comprises a target receive power for the plurality of UL sounding signals.

In Example 29, the subject matter of Example 28 optionally includes wherein the processing circuitry is further configured to: select a second plurality of second wireless devices of the plurality of second wireless devices with a receive signal strength of the plurality of UL sounding signals above a threshold for an additional trigger frame; encode the additional trigger frame including second RU allocations, and second SS allocations for the second plurality of second wireless devices to transmit a second plurality of UL sounding signals, and including an indication that the additional trigger frame is for the second plurality of UL sounding signals, and wherein the additional trigger frame comprises a second target receive power greater than the target receive power; configure the first wireless device to transmit the additional trigger frame to the second plurality of second wireless devices; and decode the second plurality of UL sounding signals from the plurality of second wireless devices.

Example 30 is an apparatus of a first wireless device, the apparatus including: means for decoding a trigger frame including a resource unit (RU) allocation, and a spatial stream (SS) allocation for the first wireless device to transmit an uplink (UL) sounding signal, and wherein the trigger frame comprises an indication that the trigger frame is for the UL sounding signal and an indication of a transmit power used by a second wireless device to transmit the trigger frame; means for determining a path loss based on the indication of the transmit power and a received power of the trigger frame at the first wireless device; means for determining a transmit power for the UL sounding signal based on the path loss; and means for configuring the first wireless device to transmit the UL sounding signal in accordance with the RU allocation, the SS allocation, and the transmit power.

In Example 31, the subject matter of Example 30 optionally includes wherein the trigger frame further comprises a target receive power for the UL sounding signal, and wherein the apparatus further comprises: means for determining the transmit power for transmission of the UL sounding signal based on the path loss so that the UL sounding signal will be received by the second wireless device with the target receive power.

In Example 32, the subject matter of Example 31 optionally includes the apparatus further including: means for normalizing the target receive power in accordance with a bandwidth of the RU allocation, wherein the target receive power is a target receive power density.

In Example 33, the subject matter of any one or more of Examples 30-32 optionally include the apparatus including: means for determining the transmit power to be a power below a limit but large enough for a highest modulation and coding scheme (MCS) the first wireless device is able to use to encode a packet to transmit to communicate with the second wireless device within a reliability parameter.

In Example 34, the subject matter of Example 33 optionally includes wherein the limit is a regulatory transmission limit for the RU allocation, a co-location transmission limit, or a power amplifier limit.

In Example 35, the subject matter of Example 34 optionally includes the apparatus further including: means for determining the highest MCS the first wireless device is able to use based on an estimated error vector magnitude (EVM) of a packet to be received at the second wireless device, wherein the packet is to be encoded with the highest MCS.

In Example 36, the subject matter of any one or more of Examples 30-35 optionally include wherein the trigger frame comprises a carrier sense field to indicate if the first wireless device is to perform a clear channel analysis (CCA) before transmitting the UL sounding signal, and wherein the apparatus further comprises: if the carrier sense field indicates that a CCA is to be performed before transmitting the UL sounding signal, means for performing a clear channel analysis (CCA) on the RU allocation, and if the CCA indicates the RU allocation is idle, means for configuring the first wireless device to transmit the UL sounding signal in accordance with the RU allocation, the SS allocation, and the transmit power.

In Example 37, the subject matter of any one or more of Examples 30-36 optionally include wherein the UL sounding signal is a null data packet (NDP).

In Example 38, the subject matter of any one or more of Examples 30-37 optionally include wherein the trigger frame indicates that the trigger frame is for the UL sounding signal based on a length or duration field of the trigger frame that indicates there is no length or duration for data, or based on a trigger frame type field.

In Example 39, the subject matter of any one or more of Examples 30-38 optionally include wherein the trigger frame indicates the UL sounding signal is to be one from the following group: an high efficiency (HE) preamble symbol duration of 3.2 µs (1× long-training field (LTF)), a HE preamble symbol duration of 6.4 µs (2×LTF), a HE preamble symbol duration of 12.8 µs (4×LTF), a legacy NDP, an Institute of Electrical and Electronic Engineers (IEEE) 802.11ac NDP format, or an IEEE 802.11n NDP.

In Example 40, the subject matter of any one or more of Examples 30-39 optionally include wherein the trigger frame further comprises a delay time that indicates how long the first wireless device is to wait before transmitting the UL sounding signal in accordance with the RU allocation and the SS allocation.

In Example 41, the subject matter of Example 40 optionally includes wherein one or more additional wireless devices are to transmit UL sounding signals before the delay time.

In Example 42, the subject matter of any one or more of Examples 30-41 optionally include wherein the apparatus further comprises: means for determining a transmit power to transmit the UL sounding signal based on the path loss and further based on a bandwidth of the RU allocation.

In Example 43, the subject matter of any one or more of Examples 30-42 optionally include wherein the trigger frame indicates that no acknowledgment of the UL sounding signal is to be transmitted by the second wireless device.

In Example 44, the subject matter of any one or more of Examples 30-43 optionally include the apparatus further including: means for configuring the first wireless device to transmit the UL sounding signal in accordance with the RU allocation, the SS allocation, and the transmit power, and in accordance with one or both of orthogonal frequency division multi-access (OFDMA) or multi-user multiple-input multi-output (MU-MIMO).

In Example 45, the subject matter of any one or more of Examples 30-44 optionally include wherein the first wireless device is one from the following group: an Institute of Electrical and Electronic Engineers (IEEE) 802.11ax access point, an IEEE 802.11ax station, an IEEE 802.11 station, and an IEEE 802.11 access point.

In Example 46, the subject matter of any one or more of Examples 30-45 optionally include means for processing radio signals.

In Example 47, the subject matter of Example 46 optionally includes means for transmitting and receiving radio signals.

Example 48 is a non-transitory computer-readable storage medium that stores instructions for execution by one or more processors, the instructions to configure the one or more processors to cause an apparatus of a first wireless device to: decode a trigger frame including a resource unit (RU) allocation, and a spatial stream (SS) allocation for the wireless device to transmit an uplink (UL) sounding signal, and where the trigger frame comprises an indication that the trigger frame is for the UL sounding signal; determine a transmit power to transmit the UL sounding signal based on a highest power the first wireless can use for the RU allocation; and configure the wireless device to transmit the UL sounding signal in accordance with the RU allocation, the SS allocation, and the transmit power.

In Example 49, the subject matter of Example 48 optionally includes where the highest power is based on one of the following group: a regulatory highest power for the RU allocation and a co-located wireless communication protocol highest power.

Example 50 is a method performed by an apparatus of a first wireless device, the method including: decoding a trigger frame including a resource unit (RU) allocation, and a spatial stream (SS) allocation for the wireless device to transmit an uplink (UL) sounding signal, and where the trigger frame comprises an indication that the trigger frame is for the UL sounding signal; determining a transmit power to transmit the UL sounding signal based on a highest power the first wireless can use for the RU allocation; and configuring the wireless device to transmit the UL sounding signal in accordance with the RU allocation, the SS allocation, and the transmit power.

In Example 51, the subject matter of Example 50 optionally includes where the highest power is based on one of the following group: a regulatory highest power for the RU allocation and a co-located wireless communication protocol highest power.

Example 52 is an apparatus of a first wireless device, the apparatus including: means for decoding a trigger frame including a resource unit (RU) allocation, and a spatial stream (SS) allocation for the wireless device to transmit an uplink (UL) sounding signal, and where the trigger frame comprises an indication that the trigger frame is for the UL sounding signal; means for determining a transmit power to transmit the UL sounding signal based on a highest power the first wireless can use for the RU allocation; and means for configuring the wireless device to transmit the UL sounding signal in accordance with the RU allocation, the SS allocation, and the transmit power.

In Example 53, the subject matter of Example 52 optionally includes where the highest power is based on one of the following group: a regulatory highest power for the RU allocation and a co-located wireless communication protocol highest power.

Example 54 is a non-transitory computer-readable storage medium that stores instructions for execution by one or more processors, the instructions to configure the one or more processors to cause an apparatus of a first wireless device to: encode a trigger frame including resource unit (RU) allocations, and spatial stream (SS) allocations for a plurality of second wireless devices to transmit a plurality of uplink (UL) sounding signals, and including an indication that the trigger frame is for the plurality of UL sounding signals; configure the first wireless device to transmit the trigger frame to the plurality of second wireless devices; and decode the plurality of UL sounding signals from the plurality of second wireless devices.

In Example 55, the subject matter of Example 54 optionally includes where the trigger frame further comprises an indication of a delay for each of the plurality of second wireless devices to transmit the UL sounding signals, and where the delay is a same first delay for a first one or more of the plurality of second wireless devices and a same second delay for a second one or more of the plurality of second wireless devices.

In Example 56, the subject matter of any one or more of Examples 54-55 optionally include where the trigger frame comprises a cascade field that indicates an additional trigger frame is to be transmitted and where the instructions further configure the one or more processors to cause the apparatus to: encode the additional trigger frame including second RU allocations, and second spatial stream (SS) allocations for a plurality of third wireless devices to transmit a second plurality of UL sounding signals, and including a second indication that the additional trigger frame is for the second plurality of UL sounding signals; configure the first wireless device to transmit the additional trigger frame to the plurality of third wireless devices; and decode the second plurality of UL sounding signals from the plurality of third wireless devices.

In Example 57, the subject matter of any one or more of Examples 54-56 optionally include where the trigger frame further comprises a target receive power for the plurality of UL sounding signals.

In Example 58, the subject matter of any one or more of Examples 54-57 optionally include where the instructions further configure the one or more processors to cause the apparatus to: select a second plurality of second wireless devices of the plurality of second wireless devices with a receive signal strength of the plurality of UL sounding signals above a threshold for an additional trigger frame; encode the additional trigger frame including second RU allocations, and second SS allocations for the second plurality of second wireless devices to transmit a second plurality of UL sounding signals, and including an indication that the additional trigger frame is for the second plurality of UL sounding signals, and where the additional trigger frame comprises a second target receive power greater than the target receive power; configure the first wireless device to transmit the additional trigger frame to the second plurality of second wireless devices; and decode the second plurality of UL sounding signals from the plurality of second wireless devices.

Example 59 is a method performed by an apparatus of a first wireless device to: encode a trigger frame including resource unit (RU) allocations, and spatial stream (SS) allocations for a plurality of second wireless devices to transmit a plurality of uplink (UL) sounding signals, and including an indication that the trigger frame is for the plurality of UL sounding signals; configure the first wireless device to transmit the trigger frame to the plurality of second wireless devices; and decode the plurality of UL sounding signals from the plurality of second wireless devices.

In Example 60, the subject matter of Example 59 optionally includes where the trigger frame further comprises an indication of a delay for each of the plurality of second wireless devices to transmit the UL sounding signals, and where the delay is a same first delay for a first one or more of the plurality of second wireless devices and a same second delay for a second one or more of the plurality of second wireless devices.

In Example 61, the subject matter of any one or more of Examples 59-60 optionally include where the trigger frame comprises a cascade field that indicates an additional trigger frame is to be transmitted and where the method further comprises: encoding the additional trigger frame including second RU allocations, and second spatial stream (SS) allocations for a plurality of third wireless devices to transmit a second plurality of UL sounding signals, and including a second indication that the additional trigger frame is for the second plurality of UL sounding signals; configuring the first wireless device to transmit the additional trigger frame to the plurality of third wireless devices; and decoding the second plurality of UL sounding signals from the plurality of third wireless devices.

In Example 62, the subject matter of any one or more of Examples 59-61 optionally include where the trigger frame further comprises a target receive power for the plurality of UL sounding signals.

In Example 63, the subject matter of any one or more of Examples 59-62 optionally include where the method further comprises: selecting a second plurality of second wireless devices of the plurality of second wireless devices with a receive signal strength of the plurality of UL sounding signals above a threshold for an additional trigger frame; encoding the additional trigger frame including second RU allocations, and second SS allocations for the second plurality of second wireless devices to transmit a second plurality of UL sounding signals, and including an indication that the additional trigger frame is for the second plurality of UL sounding signals, and where the additional trigger frame comprises a second target receive power greater than the target receive power; configuring the first wireless device to transmit the additional trigger frame to the second plurality of second wireless devices; and decoding the second plurality of UL sounding signals from the plurality of second wireless devices.

Example 64 is an apparatus of a first wireless device, the apparatus including: means for encoding a trigger frame including resource unit (RU) allocations, and spatial stream (SS) allocations for a plurality of second wireless devices to transmit a plurality of uplink (UL) sounding signals, and including an indication that the trigger frame is for the plurality of UL sounding signals; means for configuring the first wireless device to transmit the trigger frame to the plurality of second wireless devices; and means for decoding the plurality of UL sounding signals from the plurality of second wireless devices.

In Example 65, the subject matter of Example 64 optionally includes where the trigger frame further comprises an indication of a delay for each of the plurality of second wireless devices to transmit the UL sounding signals, and where the delay is a same first delay for a first one or more of the plurality of second wireless devices and a same second delay for a second one or more of the plurality of second wireless devices.

In Example 66, the subject matter of any one or more of Examples 64-65 optionally include where the trigger frame comprises a cascade field that indicates an additional trigger frame is to be transmitted and where the apparatus further comprises: means for encoding the additional trigger frame including second RU allocations, and second spatial stream (SS) allocations for a plurality of third wireless devices to transmit a second plurality of UL sounding signals, and including a second indication that the additional trigger frame is for the second plurality of UL sounding signals; means for configuring the first wireless device to transmit the additional trigger frame to the plurality of third wireless devices; and means for decoding the second plurality of UL sounding signals from the plurality of third wireless devices.

In Example 67, the subject matter of any one or more of Examples 64-66 optionally include where the trigger frame further comprises a target receive power for the plurality of UL sounding signals.

In Example 68, the subject matter of any one or more of Examples 64-67 optionally include where the apparatus further comprises: means for selecting a second plurality of second wireless devices of the plurality of second wireless devices with a receive signal strength of the plurality of UL sounding signals above a threshold for an additional trigger frame; means for encoding the additional trigger frame including second RU allocations, and second SS allocations for the second plurality of second wireless devices to transmit a second plurality of UL sounding signals, and including an indication that the additional trigger frame is for the second plurality of UL sounding signals, and where the additional trigger frame comprises a second target receive power greater than the target receive power; means for configuring the first wireless device to transmit the additional trigger frame to the second plurality of second wireless devices; and means for decoding the second plurality of UL sounding signals from the plurality of second wireless devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station configured for communicating through a wireless medium, the apparatus comprising: memory; and processing circuitry coupled to the memory, the processing circuitry configured to:
   decode a trigger frame, the trigger frame comprising a common information field and a plurality of user information fields, the common information field comprising a trigger frame type subfield, a cascade subfield, a carrier sense (CS) required subfield, and an access point (AP) transmit power subfield, the trigger frame type subfield indicating the trigger frame is for sounding and the cascade subfield indicating whether a subsequent trigger frame is scheduled for transmission, wherein a user information field of the plurality of user information fields comprises an association identification (AID) subfield indicating an AID of the station, a spatial stream (SS) allocation subfield, and a target receive signal strength indicator (RSSI) subfield;
   if the CS required subfield indicates the station is to sense the wireless medium, perform a clear channel assessment (CCA); and
   in response to the CCA indicating the medium is not busy or the CS required subfield indicating the station is not to sense the medium,
   determine a path loss based on an AP transmit power indicated by the AP transmit power subfield and a measured received power of the trigger frame,
   determine a transmit power for an UL null data packet (NDP), the transmit power for the UL NDP based on the path loss and a target receive power of the UL NDP indicated by the UL target RSSI subfield, and
   configure the station to transmit the UL NDP in accordance with a SS allocation indicated by the SS subfield and the transmit power for the UL NDP, wherein the apparatus further comprises:
   a mixer comprising one of a super-heterodyne mixer or a direct conversion mixer, wherein when the mixer is a direct conversion mixer, the direct conversion mixer is configured to directly downconvert radio frequency (RF) signals to baseband signals, wherein the processing circuitry is configured to decode the baseband signals, the baseband signals including the trigger frame, and wherein when the mixer is a super-heterodyne mixer, the super-heterodyne mixer is configured to downconvert the RF signals to intermediate frequency signals prior to generation of baseband signals, and wherein the processing circuitry is configured to decode the baseband signals, the baseband signals including a trigger frame.

2. The apparatus of claim 1, wherein the processing circuitry is further configured to:
   in response to the CCA indicating the medium is busy, refrain from transmitting the UL NDP.

3. The apparatus of claim 1, wherein determine the transmit power for the UL NDP transmission further comprises:

determine the transmit power for the UL NDP transmission to be the path loss plus the target receive power of the UL NDP transmission indicated by the UL target RSSI subfield.

4. The apparatus of claim 1, wherein the common information field further comprises a length subfield, the length subfield indicating a length of the UL NDP transmission.

5. The apparatus of claim 1, wherein configure the station to transmit the UL NDP further comprises:
configure the station to transmit the UL NDP a short interframe space (SIFS) after a reception of the trigger frame is completed and in accordance with the SS allocation indicated by the SS subfield and the transmit power.

6. The apparatus of claim 1, wherein the common information field further comprises a NDP type subfield, the NDP type subfield indicating information for how long training fields (LTFs) of the NDP are to be transmitted.

7. The apparatus of claim 1, wherein the target receive power is a target receive power density.

8. The apparatus of claim 1, wherein the user information field of the plurality of user information fields further comprises a resource unit (RU) allocation for the station, and wherein configure the station to transmit the UL NDP packet further comprises:
configure the station to transmit the UL NDP in accordance with the SS allocation indicated by the SS subfield, the transmit power, and the RU allocation.

9. The apparatus of claim 1, wherein determine the transmit power for the UL NDP further comprises:
determine the transmit power for the UL NDP based on the path loss and the target receive power of the UL NDP indicated by the UL target RSSI subfield, wherein the target receive power of the UL NDP is adjusted based on a size of the RU allocation.

10. The apparatus of claim 1, wherein the user information field of the plurality of user information fields further comprises a subfield that indicates a delay time that indicates how long the station is to wait before transmitting the UL NDP.

11. The apparatus of claim 1, wherein configure the station to transmit the UL NDP packet further comprises:
configure the station to transmit the UL NDP in accordance with the SS allocation indicated by the SS subfield, the transmit power, and in accordance with one or both of orthogonal frequency division multi-access (OFDMA) or multi-user multiple-input multi-output (MU-MIMO).

12. The apparatus of claim 1, wherein determine the transmit power for the UL NDP further comprises:
limit a maximum value of the transmit power based on a regulatory transmission power limit, a co-location transmission power limit, or a power amplifier transmission power limit.

13. The apparatus of claim 1, wherein the station is configured to operate in accordance with Institute of Electrical and Electronic Engineers (IEEE) 802.11ax or IEEE 802.11.

14. A non-transitory computer-readable storage medium that stores instructions for execution by one or more processors of an apparatus of a station, the instructions to configure the one or more processors to:
decode a trigger frame, the trigger frame comprising a common information field and a plurality of user information fields, the common information field comprising a trigger frame type subfield, a cascade subfield, a carrier sense (CS) required subfield, and an access point (AP) transmit power subfield, the trigger frame type subfield indicating the trigger frame is for sounding and the cascade subfield indicating whether a subsequent trigger frame is scheduled for transmission, wherein a user information field of the plurality of user information fields comprises an association identification (AID) subfield indicating the AID of the station, a spatial stream (SS) allocation subfield, and a target receive signal strength indicator (RSSI) subfield;
if the CS required subfield indicates the station is to sense the medium, perform a clear channel assessment (CCA); and
in response to the CCA indicating the medium is not busy or the CS required subfield indicating the station is not to sense the medium,
determine a path loss based on an AP transmit power indicated by the AP transmit power subfield and a measured received power of the trigger frame,
determine a transmit power for an UL null data packet (NDP), the transmit power based on the path loss and a target receive power of the UL NDP indicated by the UL target RSSI subfield, and
configure the station to transmit the UL NDP in accordance with a SS allocation indicated by the SS subfield and the transmit power, wherein the apparatus further comprises:
a mixer comprising one of a super-heterodyne mixer or a direct conversion mixer, wherein when the mixer is a direct conversion mixer, the instructions configure the direct conversion mixer to directly downconvert radio frequency (RF) signals to baseband signals, and configure the one or more processors to decode the baseband signals, the baseband signals including the trigger frame, and wherein when the mixer is a super-heterodyne mixer, the instructions configure the super-heterodyne mixer to downconvert the RF signals to intermediate frequency signals prior to generation of baseband signals and configure the one or more processors to decode the baseband signals, the baseband signals including a trigger frame.

15. The non-transitory computer-readable storage medium of claim 14, wherein the instructions further configure the one or more processors to:
in response to the CCA indicating the medium is busy, refrain from transmitting the UL NDP transmission.

16. The non-transitory computer-readable storage medium of claim 1, wherein the instructions further configure the one or more processors to:
determine the transmit power for the UL NDP transmission to be the path loss plus the target receive power of the UL NDP transmission indicated by the UL target RS8I subfield.

17. A method performed by an apparatus of a station, the method comprising:
decoding a trigger frame, the trigger frame comprising a common information field and a plurality of user information fields, the common information field comprising a trigger frame type subfield, a cascade subfield, a carrier sense (CS) required subfield, and an access point (AP) transmit power subfield, the trigger frame type subfield indicating the trigger frame is for sounding and the cascade subfield indicating whether a subsequent trigger frame is scheduled for transmission, wherein a user information field of the plurality of user information fields comprises an association identification (AID) subfield indicating the AID of the station, a spatial stream (SS) allocation subfield, and a target receive signal strength indicator (RSSI) subfield;

if the CS required subfield indicates the station is to sense the medium, performing a clear channel assessment (CCA); and in response to the CCA indicating the medium is not busy or the CS required subfield indicating the station is not to sense the medium, determining a path loss based on an AP transmit power indicated by the AP transmit power subfield and a measured received power of the trigger frame, determining a transmit power for an UL null data packet (NDP), the transmit power based on the path loss and a target receive power of the UL NDP indicated by the UL target RSSI subfield, and configuring the station to transmit the UL NDP in accordance with a SS allocation indicated by the SS subfield and the transmit power, wherein the apparatus further comprises:

a mixer comprising one of a super-heterodyne mixer or a direct conversion mixer, wherein when the mixer is a direct conversion mixer, the method further comprises:

the direct conversion mixer directly downconverting radio frequency (RF) signals to baseband signals and the apparatus decoding the baseband signals, the baseband signals including the trigger frame, and when the mixer is a super-heterodyne mixer, the method further comprises: the super-heterodyne mixer downconverting the RF signals to intermediate frequency signals prior to generation of baseband signals, and the apparatus decoding the baseband signals, the baseband signals including a trigger frame.

18. The method of claim 17, wherein the instructions further configure the one or more processors to:

in response to the CCA indicating the medium is busy, refrain from transmitting UL NDP transmission.

* * * * *